US009258531B2

(12) United States Patent
Jia et al.

(10) Patent No.: US 9,258,531 B2
(45) Date of Patent: Feb. 9, 2016

(54) SYSTEM AND METHOD FOR VIDEO-QUALITY ENHANCEMENT

(75) Inventors: Zhen Jia, Shanghai (CN); Lei Sun, Shanghai (CN); Hongcheng Wang, Vernon, CT (US); Ziyou Xiong, Wethersfield, CT (US); Jianwei Zhao, Shanghai (CN); Rodrigo Esteban Caballero, Middletown, CT (US); Alan Matthew Finn, Hebron, CT (US)

(73) Assignee: UTC FIRE & SECURITY CORPORATION, Farmington, CT (US)

( * ) Notice: Subject to any disclaimer, the term of this patent is extended or adjusted under 35 U.S.C. 154(b) by 862 days.

(21) Appl. No.: 13/509,924

(22) PCT Filed: Jul. 27, 2009

(86) PCT No.: PCT/US2009/004337
§ 371 (c)(1),
(2), (4) Date: May 15, 2012

(87) PCT Pub. No.: WO2011/014138
PCT Pub. Date: Feb. 3, 2011

(65) Prior Publication Data
US 2012/0236184 A1 Sep. 20, 2012

(51) Int. Cl.
G06K 9/00 (2006.01)
G06K 9/40 (2006.01)
H04N 5/00 (2011.01)
H04N 7/18 (2006.01)
G06T 5/00 (2006.01)
H04N 5/21 (2006.01)

(52) U.S. Cl.
CPC ........ *H04N 7/18* (2013.01); *G06T 5/005* (2013.01); *H04N 5/21* (2013.01); *G06T 2207/10016* (2013.01); *G06T 2207/30192* (2013.01); *G06T 2207/30232* (2013.01)

(58) Field of Classification Search
None
See application file for complete search history.

(56) References Cited

U.S. PATENT DOCUMENTS

| 6,462,768 | B1 | 10/2002 | Oakley |
| 8,180,099 | B2 * | 5/2012 | Heenan et al. ............... 382/100 |
| 2002/0006231 | A1 | 1/2002 | Jayant et al. |
| 2006/0008118 | A1 * | 1/2006 | Matsuoka et al. ........... 382/103 |
| 2007/0211935 | A1 * | 9/2007 | Yoo et al. ..................... 382/162 |
| 2007/0280504 | A1 * | 12/2007 | Badawy et al. .............. 382/104 |
| 2008/0063237 | A1 | 3/2008 | Rubenstein |

(Continued)

OTHER PUBLICATIONS

European Search Report for application EP 09847887.8, dated Jun. 18, 2015, 25 pages.
Garg, K. et al., "Detection and removal of rain from videos", 2004 IEEE Computer Society Conference on Computer Vision and Pattern Recognition Jun. 27-Jul. 2, 2004, 12 pages.
Yamashita, A. et al., "Robust sensing against bubble noises in aquatic environments with a stereo vision system", IEEE International Conference on Robotics and Automation, May 15-19, 2006, 6 pages.
Zhang, Xiaopeng et al., "Rain Removal in Video by Combining Temporal and Chromatic Properties", IEEE International Conference on Multimedia and Expo, Jul. 9-12, 2006, 18 pages.

*Primary Examiner* — Matthew Bella
*Assistant Examiner* — Jose M Torres
(74) *Attorney, Agent, or Firm* — Cantor Colburn LLP

(57) ABSTRACT

A video enhancement system provides automatic enhancement to video data that includes the presence of obscurations. The system provides near-field enhancement of the video data by detecting the presence of near-field obscurations such as snowflakes/raindrops and determining whether the detected obscurations are located over background pixels or foreground objects. The detected obscuration pixels are filled-in depending on whether they are located over the background or foreground to create an enhanced image. The system may also provide local/global adaptive contrast enhancement to enhance video in the presence of far-field obscurations.

19 Claims, 7 Drawing Sheets

(56) References Cited

U.S. PATENT DOCUMENTS

2008/0187219 A1* 8/2008 Chen et al. .................... 382/173
2009/0016636 A1* 1/2009 Kasashima et al. ........... 382/274
2009/0297023 A1* 12/2009 Lipton et al. .................. 382/164
2009/0324103 A1* 12/2009 Gelfand et al. ............... 382/224
2010/0141806 A1* 6/2010 Uemura et al. ............... 348/241

* cited by examiner

Snow Map

Clean Background Map

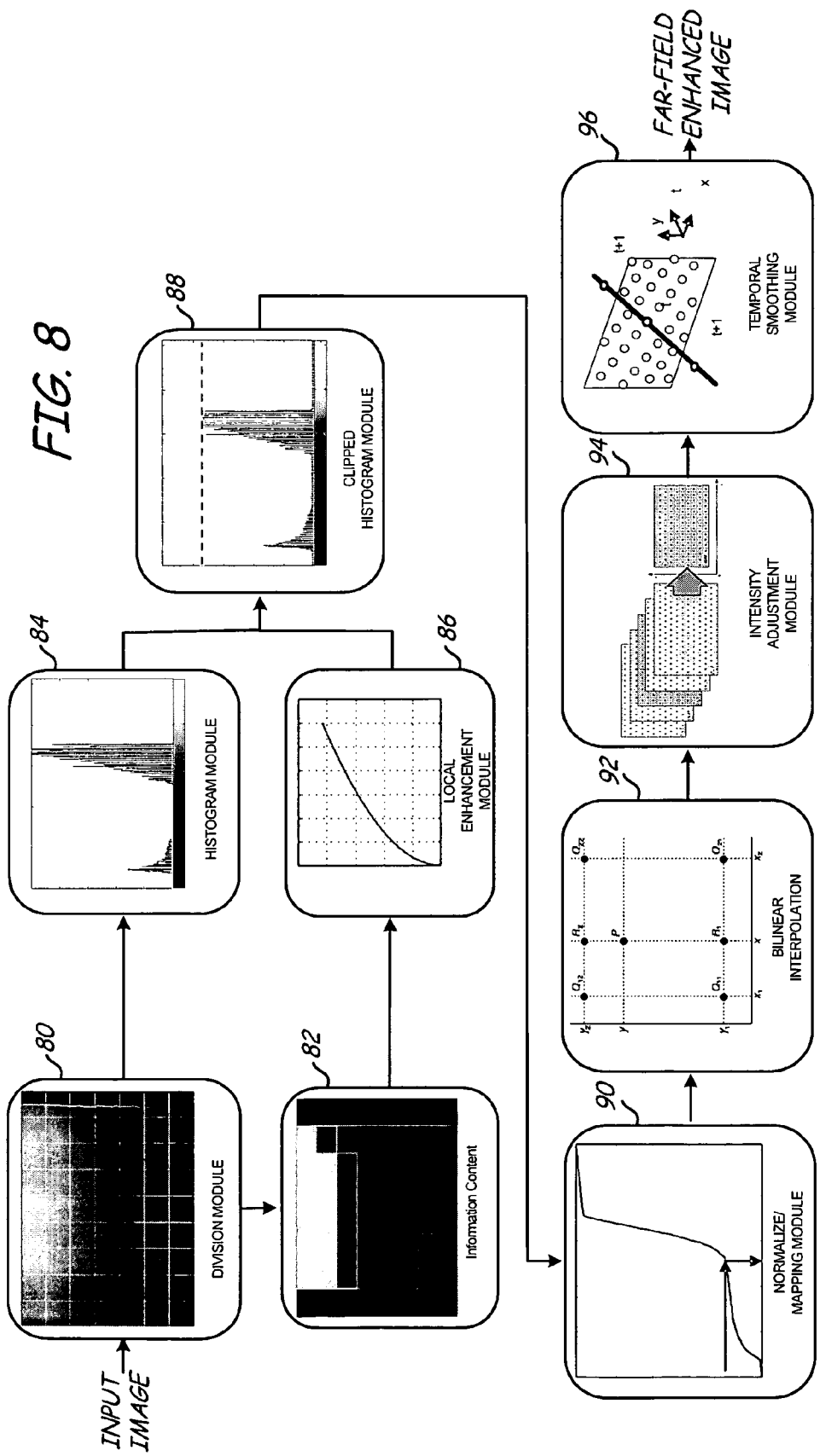

SYSTEM AND METHOD FOR VIDEO-QUALITY ENHANCEMENT

BACKGROUND

The present invention is related to computer vision and image processing, and in particular to video-quality enhancement of images containing obscuring phenomena such as either snow and/or rain.

Computer vision and image processing relates broadly to any application that makes use of image data. Video-quality enhancement refers to image processing techniques that seek to improve or otherwise enhance the quality of the video data. Video-quality enhancement may be employed to enhance data prior to subsequent video analytic software used to analyze the video data, or may be used to improve the quality of an image (i.e., frame) or sequence of frames displayed to a user.

For example, video surveillance is one application in which video quality is often-times an issue. Whether video surveillance data is monitored by a human operator or by way of video analytic software that automatically detects the presence of threats or security breaches, the quality of the video data provided to the human operator or the video analytic system is important for improving the effectiveness of the system. In particular, surveillance systems are often-times required to operate in a variety of environments, including outdoor environments. The quality of the video data provided by the video systems is therefore susceptible to weather events such as rain and/or snow that will obscure or otherwise degrade the quality of the video data provided by the system. It would therefore be desirable to develop an automatic video-quality enhancement system and method for improving the quality of video data affected by the presence of snow and/or rain.

SUMMARY

A video-quality enhancement system operates on received image data to generate an enhanced image that improves near-field vision under obscuring conditions such as rain/snow. The system includes an input that receives image data and a near-field enhancement module that operates on the received image data. The near-field enhancement module identifies obscuration pixels in the received image data and determines whether the identified near-field obscuration pixels are located on a foreground object. The near-field enhancement module fills in the identified pixels based on whether the pixels are determined to be located over a foreground object or background portion of the image to create a near-field enhanced image.

In another aspect of the present invention, the video-quality enhancement system generates an enhanced image that improves far-field vision under obscuring conditions such as rain/snow. The system includes an input that receives image data and a local/global adaptive far-field enhancement module that divides the received image into a plurality of tiles. A texture value is calculated for each of the plurality of tiles, and a local/global contrast enhancement is applied to the received image based, in part, on the calculated texture value for each of the plurality of tiles to create a far-field enhanced image.

BRIEF DESCRIPTION OF THE DRAWINGS

FIG. 8 is a block diagram of functions performed by far-field enhancement module according to an embodiment of the present invention.

DETAILED DESCRIPTION

The present invention provides a system and method for automatically enhancing the quality of video data in the presence of obscuring conditions such as snow and/or rain. The exemplary embodiment will use snow and rain for illustrative purposes without restriction to only those obscuring phenomena. In particular, the present invention may provide for near-field, far-field enhancement, or both near-field enhancement and far-field enhancement. Near-field enhancement identifies and removes near-field obscurations such as snowflakes and/or raindrops that would otherwise obscure portions of the image or frame. Far-field enhancement reduces the effect of far-field obscurations such as snow and/or rain (which often appears fog-like) based on an adaptive local contrast enhancement algorithm.

Figure 1:
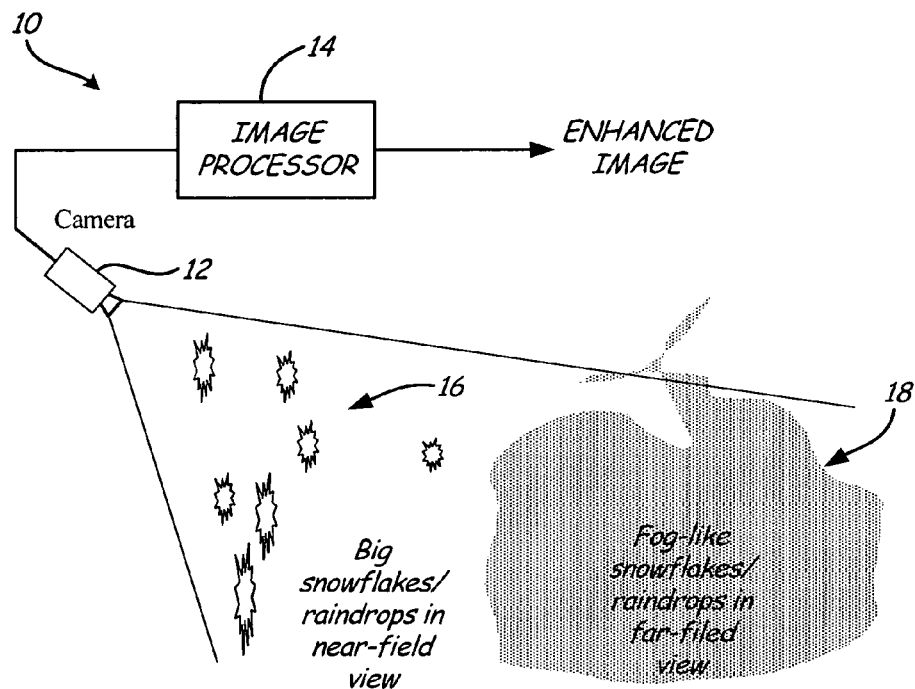
FIG. 1 is a block diagram of a video system employing an image processor according to an embodiment of the present invention.

FIG. 1 is a block diagram of video system 10 according to an embodiment of the present invention. Video system 10 includes video capture device 12 and video enhancement system 14.

Image data captured by video capture device 12 is provided to video enhancement system 14 for processing. In response to the image data (i.e., frame) provided by image capture device 12, video enhancement system 14 implements a video quality enhancement algorithm to enhance the image data. The provision of image data by video capture device 12 to image processor 14 may be by any of a number of means, e.g., by a hardwired connection, over a dedicated wireless network, over a shared wireless network, etc. Video enhancement system 14 is implemented on a hardware system, such as a dedicated video processor or a general purpose computer, and executes video enhancement software that performs functions that act to transform the underlying video data from a first, unenhanced state to an enhanced state. When executed on a computer or processor, the software comprises modules that act on the video data to implement the enhancement function. As with any computer system, the equivalent software function could be implemented in dedicated hardware.

FIG. 1 also illustrates the problem to be solved by video enhancement system 14. Video capture device 12 has a field of view that extends from near-field 16 to far-field 18. The video enhancement employed by enhancement system 14 provides for improvement of both the near-field effect of snow and/or rain and the far-field effect of snow and/or rain. In particular, the presence of snowflakes/raindrops in the near-field appear as large objects that obscure at least a portion of the field of view of video capture device 12. In the far-field however, individual snowflakes and/or raindrops are not visible, but appear rather as a fog-like cover over the field of view of video capture device 12. Providing an enhanced image in the presence of snow/rain requires video enhancement system 14 to provide enhancement designed for both near-field effects of snow/rain and far-field effects of snow/rain.

Figure 2:
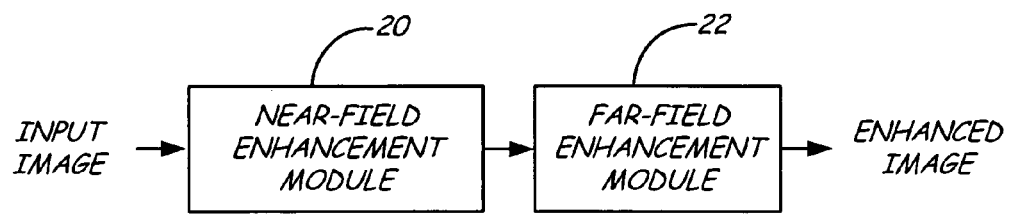
FIG. 2 is a block diagram illustrating modules employed by the image processor according to an embodiment of the present invention.

FIG. 2 is a block diagram of modules employed by video enhancement system 14 that includes near-field enhancement module 20 and far-field enhancement module 22 for providing near-field and far-field enhancement, respectively, of video data in the presence of snow/rain according to an embodiment of the present invention. Each module represents functional operations performed by video enhancement system 14. As discussed above, execution of video enhancement software on a computer (i.e., hardware) comprises modules such as near-field enhancement module 20 and adaptive far-field enhancement module 22 that act to transform video data from an unenhanced state to an enhanced state.

Near-field enhancement module 20 operates to remove snowflakes/raindrops visible in the near-field of image data provided by video capture device 12. That is, near-field enhancement module 20 seeks to identify and remove from the image data those objects identified in the near-field as snowflakes or raindrops. An exemplary embodiment of which is described in more detail below with respect to FIG. 3. Having selectively removed near-field objects identified as snowflakes and/or raindrops, the output of near-field enhancement module 20 is further enhanced by adaptive far-field enhancement module 22. In particular, adaptive far-field enhancement module 22 accounts for the presence of snow/rain in the far-field with an adaptive contrast enhancement algorithm. The output of far-field enhancement module 22 represents the enhanced image data.

Figure 3:
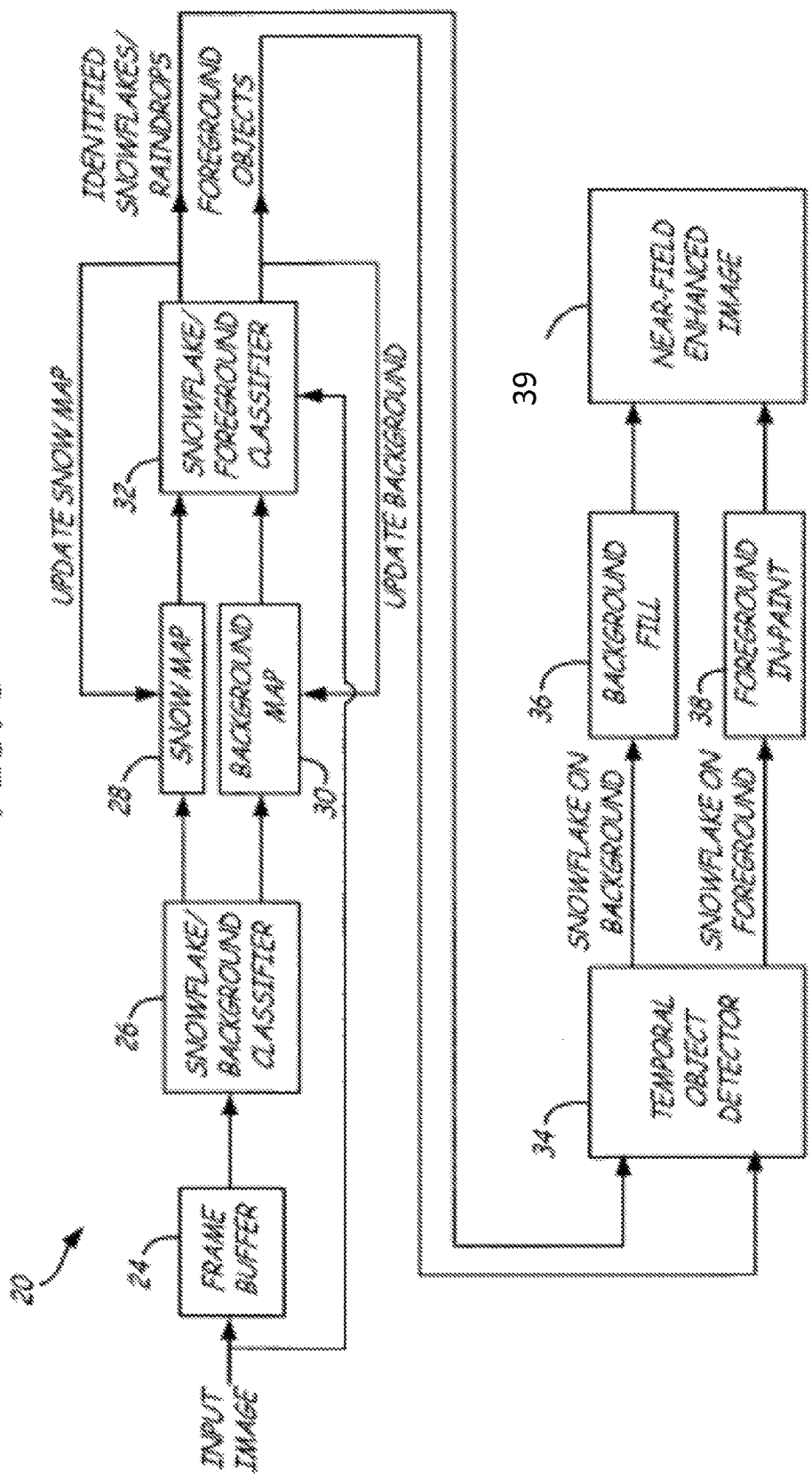
FIG. 3 is a block diagram of modules employed by the image processor to perform near-field enhancement according to an embodiment of the present invention.

FIG. 3 is a block diagram of modules employed by near-field enhancement module 20 according to an embodiment of the present invention. FIGS. 4A-6C illustrate the operations performed by near-field enhancement module 20 according to an embodiment of the present invention, and are referred to throughout the description of FIG. 3 to aid in the discussion of the present invention.

In the embodiment shown in FIG. 3, near-field enhancement module 20 includes frame buffer 24, snowflake/background classifier 26, stored snow-map image 28, stored background image 30, snowflake/foreground classifier 32, temporal object detector 34, background filler 36, and foreground filler 38.

Frame buffer 24 receives image data and collects or otherwise stores several successive image frames to form a frame cluster. The frame cluster is employed to initialize detection of snowflake/rain objects. It is preferable to initialize the system with images that include snowflakes/raindrops on a static background (i.e., without the presence of other foreground objects) to prevent non-snowflake/raindrop objects from being included on the snow-map image and/or background image. In particular, the frame cluster may be analyzed offline to create snow map 28 and background map 30 prior to real-time enhancement of the captured images. Because both snowflakes and rain are very fast moving, it is assumed that the location of snowflakes/rain will change in each successive frame. Several frames are therefore needed to determine whether to classify an object as part of the background or as a potential snowflake. Based on the temporal clustering provided by snowflake/background classifier 26, color cues are employed to create snow map 28 and background map 30. In general, classification of pixels in a current frame into either snow map 28 or background map 30 is based on the property that snowflakes/raindrops reflect incident light and therefore appear as white or near white (i.e., color information) combined with information that snowflakes/raindrops are very fast moving and therefore are not likely to remain in the same location in successive frames of image data. By employing a cluster of successive frames of image data, a clean background map can be generated. In an exemplary embodiment, classification provided by snow/background classifier 26 is based on a K-means method, a probabilistic method, a template/model based method, or a combination thereof. A K-means method is an automatic classification method that learns by clustering high-dimensional space into a specified number of clusters. Probabilistic and template/model based methods require prior knowledge of a particular pattern of interest, such as the dynamics of snowflake/raindrop movement.

Snowflake/foreground classifier 32 employs background map 30 and snow-map 28 to detect the presence of snowflakes/raindrops in the current image frame. In an exemplary embodiment, classifier 32 subtracts the snow map 28 from the current frame and the background map 30 from the current frame. Based on differences in the color of each pixel as compared with pixels making up snow map 28 and background map 30, snowflake/foreground classifier 32 determines whether a pixel is a snowflake pixel or not. If a pixel is determined to be a snowflake pixel, then a subsequent procedure, described in more detail with respect to FIGS. 6A and 6B, determines whether the snowflake pixel is located on the background or on a foreground object. In addition, all snowflake pixels (i.e., identified snowflakes) are provided in feedback to update snow map 28. If a pixel is determined to be a background pixel, then the pixel is saved as part of the background and employed to update background map 30. In addition, pixels identified as foreground objects (either snowflakes/raindrops or other objects not a part of the background) are identified and employed in subsequent steps to determine whether identified snowflakes/raindrops are located over background objects or identified foreground objects. In particular, identified snowflake/raindrop pixel are filled based on a determination of whether the identified snowflake/raindrop is located over a foreground object or background object.

Having distinguished between foreground objects and background objects, temporal object detector 34 determines whether detected snowflake/raindrop pixels (determined by snowflake/foreground classifier 32) are located over background or foreground objects. A determination that near-field snowflake/raindrop pixels are located over background portions results in the pixels being replaced (i.e., filled) with pixels from the background by background filler 36. That is, the snowflake is replaced with the background. However, if the snowflake/raindrop pixel is located over a foreground object, then filling with the background will obscure the foreground object (i.e., create a hole in the foreground object). Rather than filling with background pixels, the snowflake/raindrop pixels are filled based on the pixels associated with the detected foreground object. In both cases, the near-field snowflake/raindrop is replaced with pixels expected to be located in the area occupied by the snowflake/raindrop. The resulting image 39 generated by the combination of background filler 36 and foreground in-painter 38 removes near-field snowflakes/raindrops from the field of view to enhance the current image.

Figures 4A, 4B:
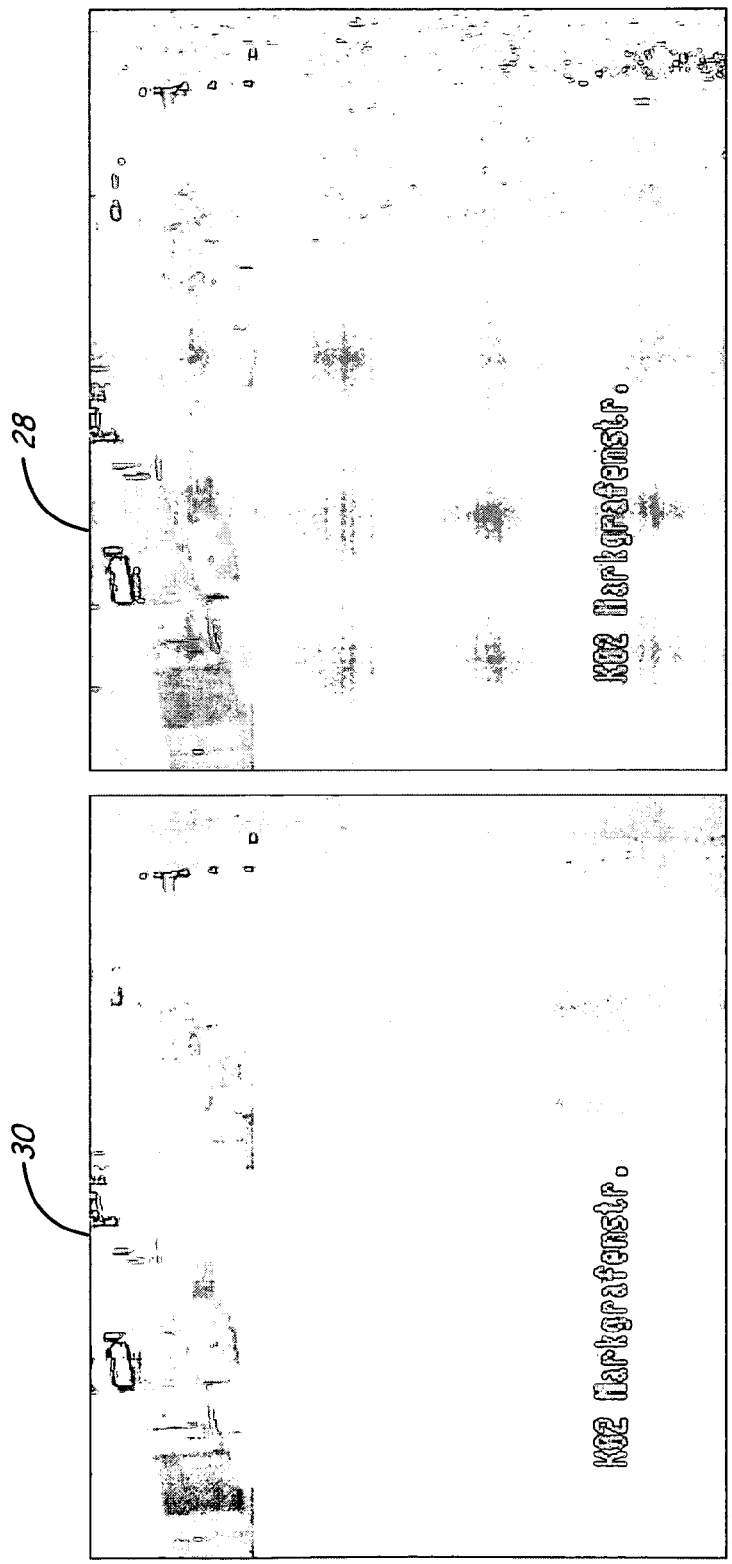
FIGS. 4A and 4B are exemplary image maps employed according to an embodiment of the present invention.

FIGS. 4A and 4B illustrates exemplary embodiments of background map 30 and snow map 28, respectively. Notice that background map 30 is relatively clean of snow and/or rain (as well as other foreground objects), while snow-map 28 includes snowflakes and/or rain identified by classifier 26. Having created and stored snow map 28 and background map 30, the system has been initialized and can be used to analyze in real-time a current frame of image data.

Figure 5:
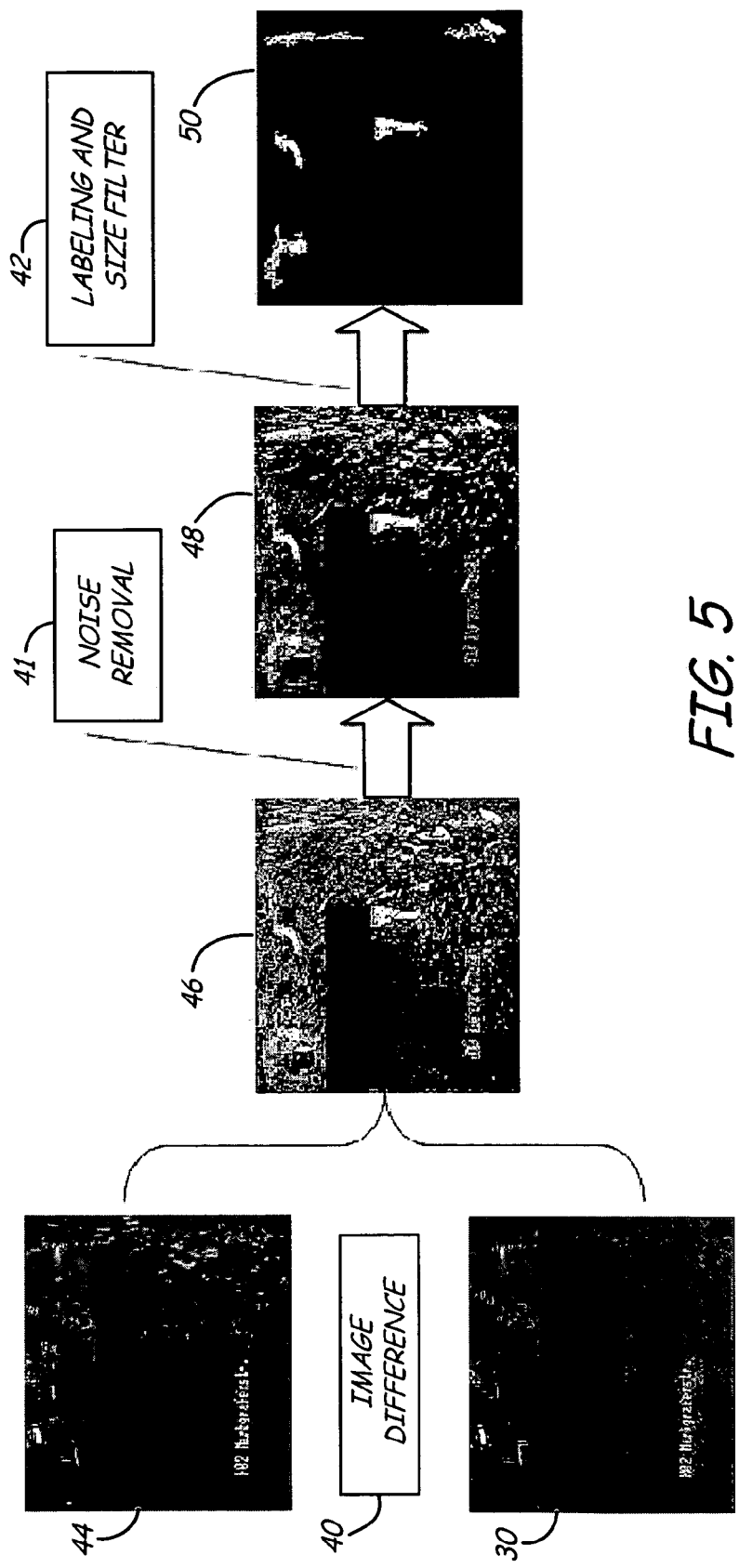
FIG. 5 provides a plurality of image frames illustrating functions performed by snowflake/foreground classifer according to an embodiment of the present invention.

FIG. 5 illustrates an exemplary embodiment of the operations performed by snowflake/foreground classifier 32 in detecting the presence of foreground objects. Functions/modules included as part of snowflake/foreground classifier 32 include image subtractor 40, noise remover 41, and filter 42. In this example, subtractor 40 calculates the difference (i.e., subtraction) between current frame 44 and background map 30. Image 46 represents the result of the subtraction. Noise remover 41 identifies and removes noise artifacts associated with the subtraction to generate image 48. Filter 42 further identifies and removes noise artifacts, such that image 50 represents foreground objects, including snowflakes/raindrops.

Figure 6A:
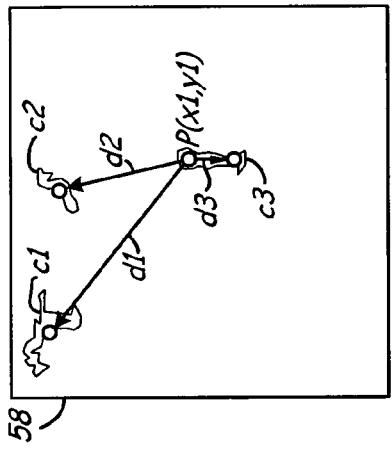
FIGS. 6A-6B illustrating calculations performed by temporal object detector to determine whether a pixel is located over a foreground object according to an embodiment of the present invention.
Figure 6A:
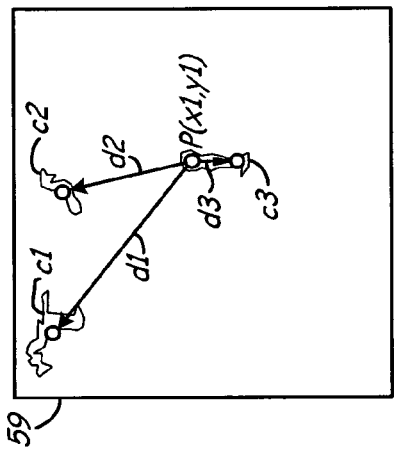
Figure 6A:
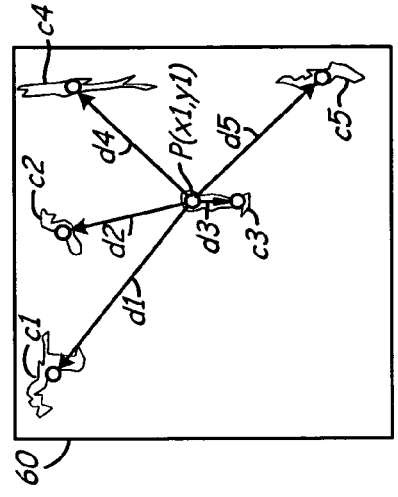
Figure 6B:
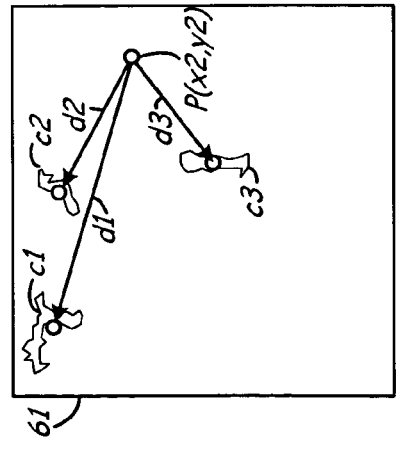
Figure 6B:
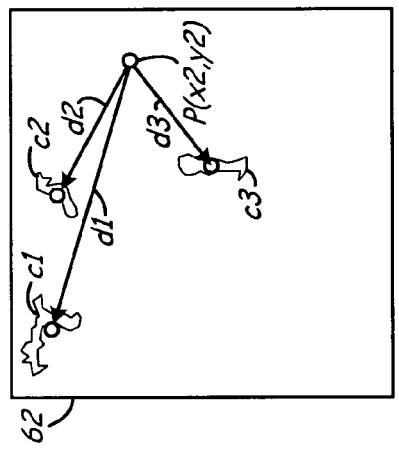
Figure 6B:
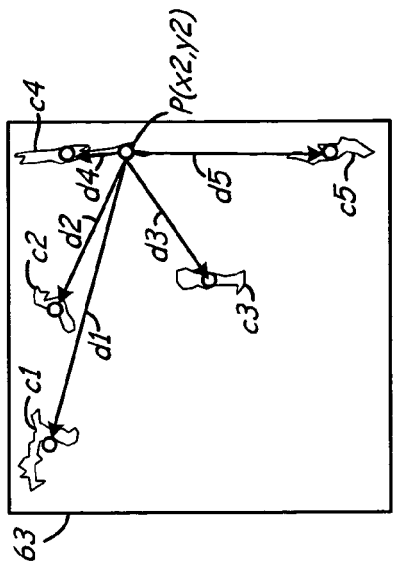

FIGS. 6A-6B illustrate an exemplary embodiment of successive images analyzed by temporal object detector 34 to determine whether an identified snowflake pixel is located over background or foreground objects. In particular, FIG. 6A illustrates analysis of successive images 58, 59 and 60 to determine that pixel P1(x1,y1) is located over a foreground object and FIG. 6B illustrates analysis of the same images 58, 59, and 60 to determine that pixel P2(x2,y2) is not located over a foreground object (i.e., located over a background portion of the image).

With respect to FIG. 6A, successive images 58, 59 and 60 represent images captured at three successive points in time (e.g., time t-2, t-1, and t, respectively). For each image, foreground objects (including snowflakes/raindrops) are identified. For example, with respect to images 58 and 59, three foreground objects—labeled c1, c2 and c3—are identified. With respect to FIG. 6B, additional foreground objects are identified—labeled c4 and c5, respectively.

Temporal object detector 34 operates on the principle that snowflakes/raindrops are moving very fast and will typically not be included in successive frames. In contrast, the position of foreground objects—even moving cars—typically remains relatively unchanged between successive frames of video data. Calculating the distance from detected snowflake/raindrop locations to nearby foreground objects (including other snowflakes) over several frames (i.e., temporal monitoring) allows the detector to determine whether the location of the snowflake is located over a background portion of the image or a foreground portion of the image. In the exemplary embodiment shown in FIGS. 6A and 6B, determining whether a snowflake occurs over a foreground object or background is based on the following rule:

if $((\text{var}(\text{Min}(d(P(x,y), c_i))_{(t-n):t}) < \text{thresh}) \text{AND}(\text{Min}(d(P(x,y),c_i)) < \text{thresh1}))$ then $P(x,y) \in \text{SnowflakesOnForegroundObject}$ else $P(x,y) \in \text{SnowflakesOnBackground}$                Equation 1

For example, with respect to FIG. 6A, snowflake locator 36 calculates the distance from identified snowflake pixel P1(x1, y1) to the center of each foreground object $c_i$ in each frame. For example, with respect to image 58, distances d1, d2 and d3 are calculated with respect to each of the foreground object c1, c2 and c3, respectively. The minimum distance between the snowflake pixel and the center of a nearest foreground object (i.e, the closest foreground object) is compared with minimum distances calculated for successive frames to determine whether the snowflake pixel is located over a foreground object. According to Equation 1, a pixel is identified as located on a foreground object if the snowflake pixel is a certain minimum distance (i.e., threshold "thresh1") from the center of the foreground object and the variation in the minimum distance over several frames is less than a certain amount (i.e., threshold "thresh"). If both of these conditions are satisfied then the snowflake pixel is identified as located over a foreground object and the snowflake is in-painted based on the foreground object it overlaps with. If one or both of these conditions are not met, then the snowflake pixel is identified as located over a background portion and the snowflake is filled based on the background.

For example, with respect to FIG. 6A, snowflake locator 36 calculates the minimum distance from snowflake pixel P1 (x1,y1) to the center of a nearest foreground object with respect to each successive image. With respect to image frames 58 and 59 the minimum distance from the snowflake pixel P1(x1,y1) to a nearest foreground object is distance d3. With respect to image frame 60, the addition of foreground objects c4 and c5 (i.e., snowflakes) does not change the minimum distance from snowflake pixel P1(x1,y1) to a nearest foreground object—which remains distance d3. In this example, the minimum distance d3 is less than the threshold value thresh1, such that the criteria $\text{Min}(d(P(x,y),c_i)) < \text{thresh1}$ is met. In addition, because the minimum distance remains relatively small with respect to each successive frame, the calculated variation in the minimum distance is less than the threshold value thresh1. As such, the criteria $(\text{var}(\text{Min}(d(P(x,y),c_i))_{(t-n):t} < \text{thresh})$ is also met, indicating that the detected snowflake pixel P(x,y) is located over a foreground object.

FIG. 6B illustrates an example in which snowflake locator 36 determines that an identified snowflake pixel P2(x2,y2) is located over a background portion of the image. Once again, successive image frames 61, 62 and 63 are analyzed, wherein snowflake locator 36 calculates the minimum distance from snowflake pixel P2(x2,y2) to the center of a nearest foreground object with respect to each successive image. With respect to image frames 61 and 62 the minimum distance from the snowflake pixel P2(x2,y2) to a nearest foreground object is distance d3. However, with respect to image frame 63, the addition of foreground objects c4 and c5 (i.e., snowflakes) changes the minimum distance from snowflake pixel P2(x2,y2) to a nearest foreground object—with distance d4 now representing the minimum distance. In this example, the minimum distance in any of the analyzed image frames is distance d3, which is less than the threshold value thresh1. As such, the criterion that the minimum distance be less than a threshold value is met. However, because the minimum distance changes with respect to each successive frame, the calculated variation in the minimum distance is greater than the threshold value thresh1. As such, the criterion that the variation in the calculated minimum distance be less than a threshold value is not met, indicating that the detected snowflake pixel P2(x2,y2) is not located over a foreground object.

Having determined that a snowflake is located over a background portion of the image, the pixels making up the snowflake are filled with background map pixels based on a background inpainting method. A number of well-known algorithms may be employed to provide background inpainting. For example, in one embodiment, background inpainting is based on the following equation:

$$P = \alpha * P_b + (1-\alpha) * P_f \qquad \text{Equation 2}$$

$P_b$ is the value of the background pixel obtained from the background map, $P_f$ is the value of the foreground object, and $\alpha$ is a weighting factor that determines how much significance to be given to the background pixel versus the foreground pixel. In the case of filling in snowflakes, the weighting factor may be close to one, to weight the significance of the background pixel values more highly.

For snowflakes/raindrops located over foreground objects, filling in pixels using Equation 2 would create holes in the foreground objects that are undesirable. Therefore, rather than employ background filling, those pixels identified as located over foreground objects are in-painted with pixels associated with the foreground object. A number of methods of image inpainting are well-known in art. For example, in one embodiment a mask of pixels identified for inpainting (i.e., those snowflake pixels identified over a foreground object) are provided as part of a mask. The masked pixels are then filled based on a form of diffusion in which nearby pixels are used to determine the value of pixels located within the mask.

Figure 7:
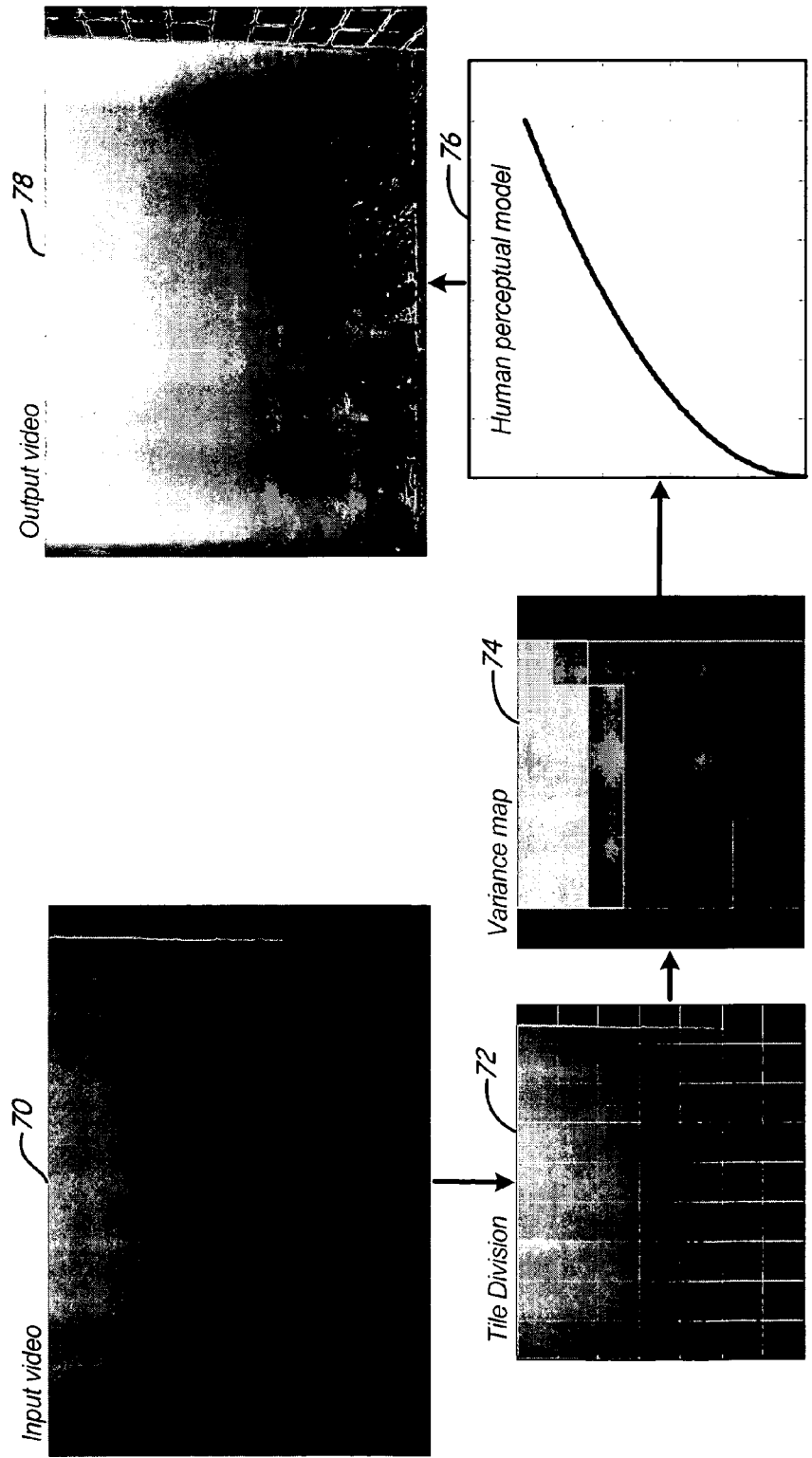
FIG. 7 provides a plurality of image frames illustrating calculations performed by far-field enhancement module according to an embodiment of the present invention.

In this way, the present invention provides near-field enhancement to enhance the near-field images captured by an image detector. In addition to near-field enhancement by near-field enhancement module 20, the present invention provides adaptive contrast enhancement to enhance the far-field part of images captured by an image detector. FIGS. 7 and 8 illustrate the functions performed by adaptive far-field enhancement module 22 to enhance far-field images with snow/rain.

FIG. 7 includes a plurality of images that illustrate operations performed by far-field enhancement module 22 in providing contrast enhancement based on an adaptive local histogram processing algorithm. In particular, adaptive local histogram processing according to the present invention is based on the idea that human perception (i.e., a person viewing enhanced video images) is more sensitive to noise and artifacts in homogenous regions than in regions with more texture. As such, an adaptive local histogram processing algorithm provides more enhancement in structured or textured areas to provide additional enhancement for image details, but provides less enhancement in homogenous or flat regions to avoid enhancing noise and compression artifacts.

In the example illustrated in FIG. 7, an input image 70 is provided to far-field enhancement module 22. Input frame 70 is processed first by near-field enhancement module 20 (shown in FIG. 2), such that all snowflakes/raindrops detected in the near-field have been removed from the input frame. In response to input frame 70, far-field enhancement module 22 divides the frame into a plurality of tiles shown in frame 72. The size of the tiles determines the scope of the local enhancement provided. Increasing the number of tiles increases the local enhancement, but also increases the risk of over-enhancement and generation of block artifacts and noise. In contrast, decreasing the number of blocks results in weaker enhancement. In this example, the frame is divided into an 8×8 grid of tiles, but fewer or greater tiles may be employed.

For each tile, far-field enhancement module 22 calculates a local variance value illustrated in frame 74 by shading associated with each tile (i.e., darker shading represents increased variance). Based on human perception model 76, an enhancement parameter v is selected for each tile based on the variance calculated for each tile. As shown by model 76, as the variance (x-axis) increases, the local enhancement parameter v (y-axis) applied to the tile is increased either linearly or non-linearly as shown in FIG. 7. Frame 78 represents the output generated in response to local enhancement provided to each tile based on the variance map 74 and human perception model 76. Increased local enhancement of the building on the right-side of the frame results in a sharper image as compared with the original input frame 70. Likewise, providing less enhancement to those areas having little or no variance results in those areas remaining relatively homogenous without the addition of noise or artifacts into these regions.

In addition to local adaptive enhancement, the present invention can provide adaptive global enhancement based on the overall compression artifacts (i.e., blockiness) value of the input. For example, in one embodiment the present invention measures the block-edge impairment (BEI) based on block artifact information which are due to video compression, and selects a global enhancement parameter based on the calculated BEI value.

FIG. 8 is a block diagram illustrating in additional detail functions performed by far-field enhancement module 22 according to an embodiment of the present invention that takes advantage of both local adaptive enhancement and global adaptive enhancement. As described with respect to FIG. 7, an input frame is divided into a plurality of tiles by block divisor 80, and variance calculator 82 creates a variance map based on the pixels' intensity variances within each tile as described with respect to FIG. 7 above. Local adaptive enhancement $v_{ij}$ is calculated by local adaptive enhancement module 86 based on the variance map.

In addition, histogram 84 is created by placing each of the pixels associated with the current frame in one of a plurality of histogram bins. The information provided by histogram 84 and adaptive local enhancement module 86 is employed by clipping module 88 to calculate a ClipLimit value that defines the enhancement applied to each tile. The enhancement amount computed by adaptive local enhancement module 86 may be soothed in space and/or time to minimize flickering effects. In particular, histogram peaks exceeding the clipping limit value are redistributed uniformly to other bins in the histogram to create a new histogram. In an exemplary embodiment, the following equation is employed to calculate the ClipLimit, taking advantage of both local adaptive enhancement and global adaptive enhancement:

$$\text{ClipLimit} = \text{avg} + \lambda * v_{ij} * (\text{max} - \text{avg}) \quad \text{Equation 3}$$

The variable avg represents the average number of pixels in each bin of histogram 84, the variable max represents the total number of pixels in each tile, $\lambda$ is a global parameter that represents the overall blockiness of the frame, and $v_{ij}$ is a local parameter that represents the texture of a local tile. The global parameter is based on measurements of the block-edge impairment (BEI), which is related to block artifacts associated with the image frame. For the variables $\lambda$ and $v_{ij}$, the amount of enhancement provided is increased as the values increase. Thus, if the global image includes a lot of blockiness (e.g., high BEI value), then the value of $\lambda$ will decrease and the overall amount of contrast enhancement provided will decrease. Likewise, if the value $v_{ij}$ increases, then the amount of enhancement provided locally increases as well. Based on the calculated ClipLimit—which in turn is based on the local adaptive enhancement and the global adaptive enhancement—contrast enhancement is applied to the frame to improve the visibility with respect to far-field snow/rain.

Normalize/mapping module 90 generates a cumulative distribution function (CFD) based on the clipped histogram map. The cumulative distribution function accumulates all bins associated with the clipped histogram map and scales the function as necessary. The scaling provided by normalize/mapping module 90 acts to adjust the illumination associated with the output image to make the output image frame brighter or darker. This scaling can help reveal more details and also reduce the block artifacts associated with the image.

For example, in one embodiment a scaling factor is selected based on the following equation:

$$\text{scalingfactor} = (\text{max} - \text{min})/\text{PixelNum} \qquad \text{Equation 4}$$

The specified min-max range represents the range of pixel values (e.g., for a grayscale image, the min-max range may be set between zero and 255) and PixelNum represents the number of pixels in the clipped histogram map. The calculated scaling factor value is applied to the cumulative distribution function, and a lookup table is employed to map the current pixel value associated with the scaled histogram map to a new value illustrated by the arrows in image 90.

After the histogram normalization and mapping, bi-linear interpolation module 92 acts to calculate the pixel value of the output frame (i.e., the enhanced image). Bi-linear interpolation is one of a variety of well-known interpolation methods that may be employed by the present invention. In particular, bi-linear interpolation provides a combination of quality and speed, but other well-known interpolation methods may similarly be employed instead of bi-linear interpolation module 92, such as bi-cubic interpolation, tri-linear interpolation, spline interpolation, stairstep interpolation and nearest neighbor interpolation. In one embodiment, the bilinear interpolation is based on the following equation:

$$P(x,y) = ((Y\text{Size} - y) * ((X\text{Size} - x) * \text{Hist}[i-1, j-1]_{(x,y)}) + x * \text{Hist}[i, j-1]_{(x,y)}) + y * ((X\text{Size} - x) * \text{Hist}[i-1, jj]_{(x,y)} + x * \text{Hist}[i, jj]_{(x,y)})/(X\text{Size} * Y\text{Size}) \qquad \text{Equation 5}$$

The value of XSize and YSize represent the size (i.e., number of pixels in the vertical and horizontal direction) for each tile. Hist[i−1,j−1], Hist[i−1,j], Hist[i,j−1] and Hist[i,j] represent the histograms of the four neighboring tiles. For example, for a pixel P(x,y) located in tile [i,j], its corresponding bin value is Hist[i,j]$_{(x,y)}$.

Intensity adjustment module 94 and temporal smoothing module 96 provide post-processing to the image provided by bi-linear interpolation module 92, generating as a result the adaptive contrast enhancement image. In particular, intensity adjustment module 94 adjusts the illumination of the image by estimating the intensity of past processed images. In this way, the current image will have a similar overall intensity level as previous images so as to reduce global flickering effects. In one embodiment, intensity adjustment module 94 employs the following equation:

$$\Delta = \frac{1}{X \cdot Y} \cdot \left( \frac{\sum_{i}^{N} \sum_{x}^{X} \sum_{y}^{Y} I_{t-i}(x, y)}{N} - \sum_{x}^{X} \sum_{y}^{Y} I_t(x, y) \right) \qquad \text{Equation 6}$$

In addition, temporal smoothing module 96 provides noise reduction based on any appropriate filter, such as the one dimensional bilateral smoothing filter shown in FIG. 8. One embodiment of noise reduction is to use edge-preserving temporal smoothing based on a bilateral filter, which replaces a pixel's value by a weighted average of its neighbors. This preserves sharp edges by systematically excluding pixels from the other side of the discontinuity.

The output image provided as a result of the modules shown in FIG. 8 is a local adaptive contrast enhancement image that is based on local image statistics and global image properties. A benefit of this system is that it does not require user initialization, but rather automatically defines parameters based on the input video signal. The local image statistics employed by the system are calculated on a tile-by-tile basis, such that different parameter values (and therefore, different levels of enhancement) may be applied to each region of the image. Because human vision is more sensitive to noise and artifacts in homogeneous regions, the present invention provides less enhancement to homogeneous regions and more enhancement to regions with greater texture. The intensity variance calculated with respect to each tile is used to estimate the "texture" of each tile, and the local texture information is used to determine the amount of enhancement to apply. In addition, the global image properties are employed to determine the overall enhancement that will be applied to a specific image.

The present invention provides automatic, real-time enhancement of image data that would otherwise be degraded by the presence of snow and/or rain. The present invention provides near-field enhancement through the use of a snowflake identifier and temporal object detection algorithm that allows the near-field enhancement to determine whether detected snowflakes/raindrops should be filled with background pixels or foreground objects. In addition, the present, invention provides far-field enhancement through the use of adaptive contract enhancement that may include both local adaptive enhancement of the image data and global adaptive enhancement of the image data. The enhanced image generated by the present invention may be provided as an output to a display, such as a monitor or computer screen for viewing/monitoring, or may be provided to a video analytic system for additional video processing (e.g., surveillance processing to detect intruders).

Although the present invention has been described with reference to preferred embodiments, workers skilled in the art will recognize that changes may be made in form and detail without departing from the spirit and scope of the invention.

The invention claimed is:

1. A video-quality enhancement system comprising:
   an input that receives image data; and
   a near-field enhancement module that identifies a near-field obscuration pixel in the received image data, determines whether the identified near-field obscuration pixel is located on a foreground object, and fills the identified near-field obscuration pixel based on the determination of whether the identified near-field obscuration pixel is located on the foreground object to generate a near-field enhanced image;
   wherein the near-field enhancement module determines whether the identified near-field obscuration pixel is located on the foreground object based on calculated distances from the identified near-field obscuration pixel to each foreground object in the image data.

2. The video-quality enhancement system of claim 1, wherein the near-field enhancement module is initialized based on a plurality of image frames that are analyzed to create a background map and an obscuration map, wherein the background map and the obscuration map are used to identify the identified near-field obscuration pixel in real-time in a current frame of image data.

3. The video-quality enhancement system of claim 1, wherein the near field enhancement module further includes:
   a temporal object detector that analyzes successive frames of image data to determine whether the identified near-field obscuration pixel is located on a background or foreground object.

4. The video-quality enhancement system of claim 1, wherein the identified near-field obscuration pixel identified by the near-field obscuration module includes a snowflake/raindrop pixel identified in the near-field of the image data.

5. The video-quality enhancement system of claim 1, further including:

an adaptive far-field enhancement module that divides the near-field enhanced image provided by the near-field enhancement module into a plurality of tiles, calculates a texture value associated with each of the plurality of tiles, and applies local enhancement to each of the plurality of tiles based on the calculated texture to generate a far-field enhanced image.

6. The video-quality enhancement system of claim 5, wherein the adaptive far-field enhancement module calculates a global blockiness value with the image data and applies local enhancement to each of the plurality of tiles based on the calculated global blockiness value.

7. A video-quality enhancement system comprising:
an input that receives image data; and
a near-field enhancement module that identifies a near-field obscuration pixel in the received image data, determines whether the identified near-field obscuration pixel is located on a foreground object, and fills the identified near-field obscuration pixel based on the determination of whether the identified near-field obscuration pixel is located on the foreground object to generate a near-field enhanced image;
wherein the near field enhancement module further includes a temporal object detector that analyzes successive frames of image data to determine whether the identified near-field obscuration pixel is located on a background or the foreground object;
wherein the temporal object detector determines whether the identified near-field obscuration pixel is located on the foreground object based on calculated minimum distances from the identified near-field obscuration pixel to each foreground object and variance of the calculated minimum distances over successive frames of image data.

8. The video-quality enhancement system of claim 7, wherein the temporal object detector determines whether the identified near-field obscuration pixel is located on the foreground object based on a minimum distance from the identified near-field obscuration pixel to a nearest foreground object and a calculated variance associated with the minimum distance from the identified near-field obscuration pixel to a nearest foreground object in each successive frame.

9. A method of enhancing video-quality for improved computer vision, the method comprising:
receiving image data from a video detector;
identifying a near-field obscuration pixel within the image data;
determining whether the identified near-field obscuration pixel is located on a foreground object within the image data; and
creating a near-field enhanced image from the image data by filling the identified near-field obscuration pixel with foreground painting if the identified near-field obscuration pixel is located over a foreground object, otherwise, filling the identified near-field obscuration pixel based on a background image;
wherein determining whether the identified near-field obscuration pixel is located on the foreground object is in response to calculated distances from the identified near-field obscuration pixel to each foreground object.

10. The method of claim 9, wherein identifying the identified near-field obscuration pixel includes subtracting a background map and an obscuration map from a current image.

11. The method of claim 9, wherein the identified near-field obscuration pixel identified within the image data includes those pixels identified as snowflake/raindrop pixels.

12. The method of claim 9, further including:
dividing the near field enhanced image into a plurality of tiles;
calculating texture values for each of the plurality of tiles and
creating a far-field enhanced image based, in part, on the calculated texture value for each of the plurality of tiles.

13. The method of claim 12, further including:
calculating a global blockiness value associated with the near-field enhanced image; and
creating the far field enhanced image based, in addition, on the calculated global blockiness value.

14. A method of enhancing video-quality for improved computer vision, the method comprising:
receiving image data from a video detector;
identifying a near-field obscuration pixel within the image data;
determining whether the identified near-field obscuration pixel is located on a foreground object within the image data; and
creating a near-field enhanced image from the image data by filling the identified near-field obscuration pixel with foreground painting if the identified near-field obscuration pixel is located over the foreground object, otherwise, filling the identified near-field obscuration pixel based on a background image;
wherein determining whether the identified near-field obscuration pixel is located on the foreground object includes calculating distances from the identified near-field obscuration pixel to a center of each foreground object identified in a plurality of images;
selecting a minimum distance for each identified near-field obscuration pixel to a nearest foreground object in the plurality of images;
calculating variances associated with the minimum distance selected for each identified near-field obscuration pixel over the plurality of images; and
determining whether the identified near-field obscuration pixel is located on the foreground object based on the selected minimum distance and the calculated variance.

15. A video-quality enhancement system for snow/rain image enhancement, the system comprising:
means for receiving image data from a video detector;
means for identifying a near-field snowflake/raindrop pixel;
means for determining whether the identified near-field snowflake/raindrop pixel is located on a foreground object; and
means for creating a near-field enhanced image by filling the identified near-field snowflake/raindrop pixel with foreground inpainting if the identified near-field snowflake/raindrop pixel is located over a foreground object, otherwise, filling the identified near-field snowflake/raindrop pixel based on a background image;
wherein the means for determining whether the identified near-field snowflake/raindrop pixel is located on the foreground object determines whether the identified near-field obscuration pixel is located on the foreground object in response to calculated distances from the identified near-field obscuration pixel to each foreground object.

16. The video-quality enhancement system of claim 15, wherein the means for identifying the near-field snowflake/raindrop pixel subtracts a stored background map and a stored snow/rain map from a current image to identify the near-field snowflake/raindrop pixel.

17. The video-quality enhancement system of claim 16, further including:
- means for dividing the near-field enhanced image into a plurality of tiles;
- means for calculating texture values for each of the plurality of tiles; and
- means for creating a far-field enhanced image based, in part, on the calculated texture value for each of the plurality of tiles.

18. The video-quality enhancement system of claim 17, further including:
- means for calculating a global blockiness value associated with the near-field enhanced image; and
- means for modifying the far-field enhanced image based, in addition, on the calculated global blockiness value.

19. A video-quality enhancement system for snow/rain image enhancement, the system comprising:
- means for receiving image data from a video detector;
- means for identifying a near-field snowflake/raindrop pixel;
- means for determining whether the identified near-field snowflake/raindrop pixel is located on a foreground object; and
- means for creating a near-field enhanced image by filling the identified near-field snowflake/raindrop pixels with foreground inpainting if the identified near-field snowflake/raindrop pixel is located over a foreground object, otherwise, filling the identified near-field snowflake/raindrop pixel based on a background image;
- wherein the means for identifying the near-field snowflake/raindrop pixel subtracts a stored background map and a stored snow/rain map from a current image to identify the identified near-field snowflake/raindrop pixel;
- wherein the means for determining whether the identified near-field snowflake/raindrop pixel is located on the foreground object includes:
- means for calculating distances from the identified near-field snowflake/raindrop pixel to a center of each foreground object identified in a plurality of images;
- means for selecting a minimum distance for each identified near-field snowflake/raindrop pixel to a nearest foreground object in the plurality of images;
- means for calculating variances associated with the minimum distance selected for each identified near-field snowflake/raindrop pixel over the plurality of images; and
- means for determining whether the identified near-field snowflake/raindrop pixel is located on the foreground object based on the selected minimum distance and the calculated variance.

* * * * *